June 18, 1929.  W. L. HOUSTON  1,717,977
AUTOMATIC VEHICLE BRAKE
Filed April 2, 1925    2 Sheets-Sheet 1

Inventor
W. L. Houston,
By
Attorney

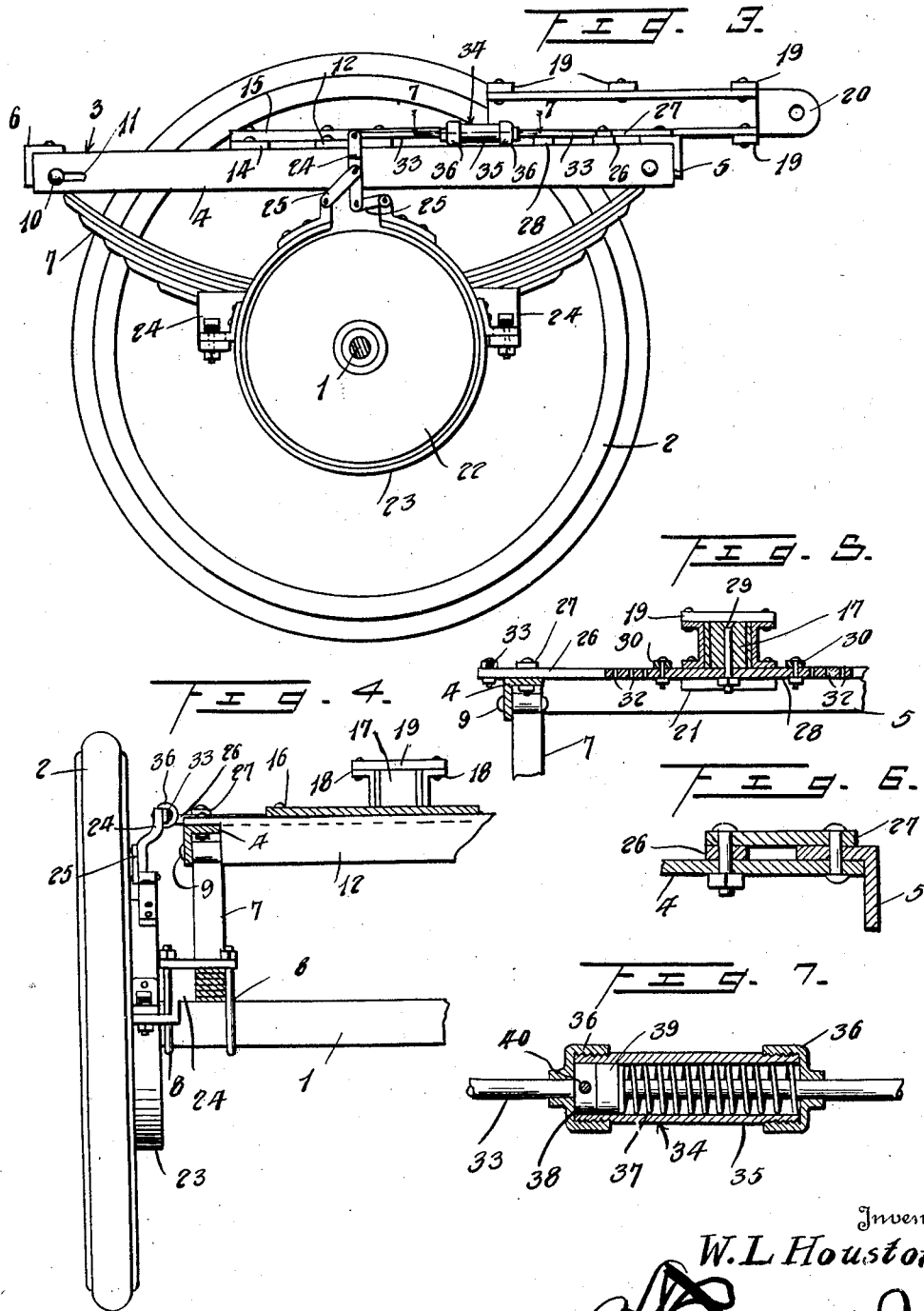

Patented June 18, 1929.

1,717,977

UNITED STATES PATENT OFFICE.

WILLIAM L. HOUSTON, OF CARRSVILLE, KENTUCKY.

AUTOMATIC VEHICLE BRAKE.

Application filed April 2, 1925. Serial No. 20,203.

This invention relates to brakes for vehicles, and more particularly to the draft bar or tongue actuated brakes forming the subject matter of my United States Patents 1,407,542, granted February 21, 1922, and 1,511,888 granted October 14, 1924.

The present invention has for one of its objects the provision of novel, simple and inexpensive means adapted to prevent the sudden application of the brakes and to insure their equal application.

A further object of the invention is the provision of means of the character stated which shall be adjustable to permit the application of the brakes under any desired or required pressure.

Figure 1:
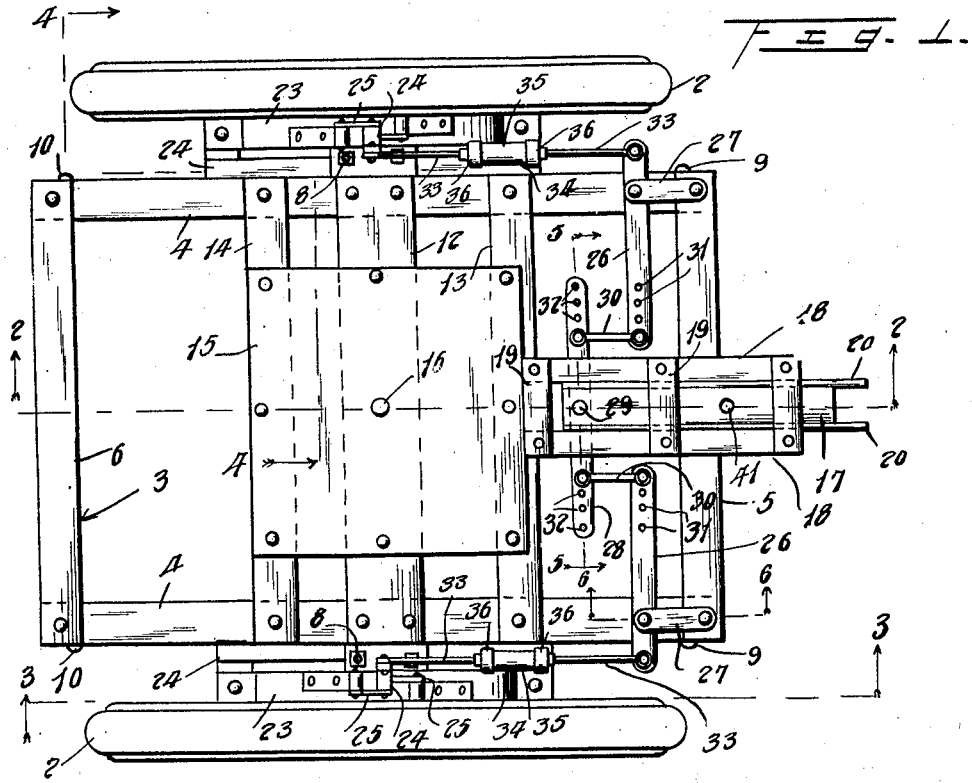
Figure 2:
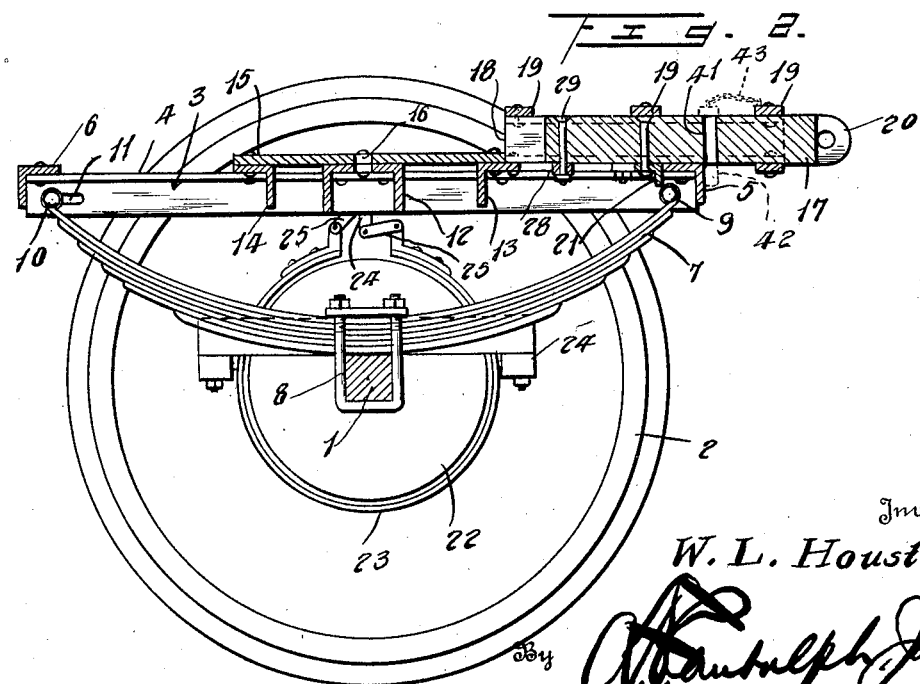

The foregoing and other objects are attained by the construction, combination and arrangement of parts hereinafter fully described and claimed, and illustrated in the accompanying drawings, wherein:

Figure 1 is a top plan view of a vehicle equipped with a brake embodying my invention, Figure 2 is a sectional view taken on the vertical plane indicated by the line 2—2 of Figure 1, Figure 3 is a similar view taken on the vertical plane indicated by the line 3—3 of Figure 1, Figure 4 is a detail sectional view taken on the vertical plane indicated by the line 4—4 of Figure 1, and Figures 5, 6 and 7 are similar views taken respectively on the planes indicated by the lines 5—5 and 6—6 of Figure 1 and the line 7—7 of Figure 3.

Corresponding and like parts are referred to in the following description and designated in the several views of the accompanying drawings by similar reference characters.

The vehicle is shown as comprising an axle 1, wheels 2 and a bed frame 3 made of angle iron and consisting of side bars 4, a front cross bar 5 and a rear cross bar 6. The frame 3 is supported from the axle 1 by semi-elliptic springs 7 which are secured to the axle by clips 8 and to the frame by bolts 9 and 10. The bolts are secured to the vertical members of the side bars 4, and to establish a slidable connection between the rear ends of the springs 7 and the rear end of the frame 3 the vertical members of the side bars 4 are provided with elongated slots 11 for the reception of the bolts 10. A center bar 12 of inverted U-shape in cross section and extending transversely of the frame 3, is secured to the horizontal members of the side bars 4, and secured to said members of the side bars are front and rear cross bars 13 and 14, respectively. The cross bars 13 and 14 are made of angle iron and are arranged in spaced parallel relation with respect to the bar 12. A plate 15 is secured to the upper sides of the cross bars 12, 13 and 14, and is provided with a centrally located opening 16 for the reception of the king or coupling pin of a reach or coupling bar, not shown.

A draft bar 17 to which a tractor or wagon tongue may be connected, is slidably mounted in a frame consisting of longitudinally extending U-bars 18 secured to the upper sides of the frame bars 5 and 13 and metal cross strips 19 secured to the bars 18. The front end of the draft bar 17 is provided with ears 20 for the reception of a coupling pin or bolt. The front edge of the plate 15 functions as a stop to limit the rearward movement of the draft bar 17 with respect to the frame 3, and the forward movement of this bar with respect to the frame is limited by a stop 21 secured to the under side of the bar for contact with the rear edge of the horizontal member of the bar 5.

Brake drums 22 are secured to the wheels 2, and contractible brake bands 23 secured to the axle 1 by brackets 24 surround the drums 22 and are adapted to be held out of contact with the drums while the vehicle is being pulled. The brake bands 23 are adapted to be contracted into contact with the drums 22 during the forward movement of the vehicle with respect to the draft bar 17 as would occur on a down grade. Brake actuating levers 24 are secured to the ends of the brake bands 23 by links 25. Levers 26 arranged on opposite sides of the draft bar 17 and extending transversely of the frame 3, are pivotally connected adjacent their outer ends to the ends of the frame bar 5 by links 27. A lever 28 pivoted centrally between its ends to the rear end of the draft bar 17 by a bolt 29, extends transversely of the draft bar and frame 3 and extends outwardly beyond the inner ends of the levers 26. The lever 28 is connected to the levers 26 by links 30. The adjacent ends of the levers 26 and 28 are provided with longitudinally extending rows of openings 31 and 32, respectively. These openings permit the links 30 to be connected to the levers 26 and 28 at different distances from the pivots thereof in order to permit the pressure under which the brake bands 23 are contracted about the brake drums 22 to be varied and controlled as the occasion requires. The outer ends of the levers 26 are connected to the brake band controlling levers 24 by rods 33 which are of sectional formation and the sections of which are connected by elastic couplings 34. Each coupling 34 comprises a hollow body 35 to the ends of which are threaded retaining caps 36, and a spring 37. The sections of the rod 33 pass through the caps 36 into the body 35 and are provided with heads 38 and 39. The heads 38 are secured to the couplings 34 by bolts 40. The heads 39 are slidably mounted in the bodies 34 and are yieldingly held under normal conditions in contact with the heads 38 by the spring 37.

From the foregoing description, taken in connection with the accompanying drawings, it should be apparent that the connection between the draft bar 17 and the brake bands 23 is such that when the vehicle is being pulled the brake bands are out of contact with the brake drums 22, and such that when the vehicle moves forwardly with respect to the draft bar 17 as would occur on a down grade, the brake bands 23 will be contracted into contact with the brake drums 22. The levers 26 and 28 and their connecting links 30 constitute an equalizing means which insures the equal application of the brakes and which may be adjusted to permit the brakes to be applied under the desired or required pressure. The elastic connection between the sections of the rods 33 prevents the too sudden application of the brakes and also functions to insure their equal application. The draft bar 17 is provided with an opening 41 for the reception of a pin 42 secured against loss by a chain 43. The pin 42 is employed only when it is desired to secure the draft bar 17 and the frame 3 against relative movement and thus prevent the application of the brake bands 23. The opening 41 occupies such a position with respect to the stop 21 that the pin 42 will contact with the front side of the frame bar 5 when the stop 21 is in contact with the rear side of the frame bar.

The advantages of the construction and of the method of operation of the invention will be readily apparent to those skilled in the art to which it appertains. While I have described the principle of operation of the invention, together with the device which I now consider to be the best embodiment thereof, I desire to have it understood that the device shown is merely illustrative, and that such changes may be made when desired as are within the scope of the invention as claimed.

What is claimed is:—

1. An automatic vehicle brake comprising, in combination with a slidable draft bar and braking elements, frame means mounting said draft bar, a lever pivoted to said draft bar and extending on opposite sides thereof, levers pivoted to said frame on opposite sides of the draft bar and forwardly of the first mentioned lever, connections on the inner side of the second mentioned levers pivotally securing them to the first mentioned lever on opposite sides of its pivot, and rods from the outer ends of the second mentioned levers to the braking elements.

2. An automatic vehicle brake comprising, in combination with a draft bar and braking elements, a frame slidably mounting said draft bar, a lever pivoted to said draft bar, levers forwardly of the first mentioned lever pivoted to the frame, the inner ends of the second mentioned levers and the ends of the first mentioned lever having connecting elements adjustably secured thereto, means pivotally connecting the second mentioned levers intermediate their ends to the frame, and rods extending from the outer ends of the second mentioned levers to said braking elements.

In testimony whereof I affix my signature.

WILLIAM L. HOUSTON.